United States Patent [19]

Nordskog

[11] 3,987,871
[45] Oct. 26, 1976

[54] TROLLEY CART BRAKING SYSTEM
[75] Inventor: Robert A. Nordskog, Tarzana, Calif.
[73] Assignee: Nordskog Company Inc., Van Nuys, Calif.
[22] Filed: Apr. 15, 1975
[21] Appl. No.: 568,273

[52] U.S. Cl. .................................. 188/5; 74/479; 280/43.24
[51] Int. Cl.² .......................................... B60T 1/14
[58] Field of Search ............... 188/5, 19, 21, 32; 74/479, 512; 280/43.24

[56] References Cited
UNITED STATES PATENTS

| | | |
|---|---|---|
| 2,897,910 | 8/1959 | Steely et al. ............ 280/43.24 X |
| 3,216,531 | 11/1965 | Hutchinson .................... 188/5 |
| 3,735,841 | 5/1973 | Auriemma ..................... 188/5 |

FOREIGN PATENTS OR APPLICATIONS

| | | |
|---|---|---|
| 147,859 | 7/1936 | Austria ........................ 188/5 |
| 123,606 | 12/1948 | Sweden ....................... 188/5 |
| 244,558 | 4/1947 | Switzerland .................. 188/5 |

Primary Examiner—Trygve M. Blix
Assistant Examiner—Edward R. Kazenske
Attorney, Agent, or Firm—Robert E. Geauque

[57] ABSTRACT

A brake device for a cart separate from the cart wheels and operated by downward movement of a foot pedal to cause engagement of feet with the floor and thereafter movement of at least some of the cart wheels a small distance off of the floor, the feet being disengaged from the floor to place the full weight of the cart back on the floor by downward movement of a second foot pedal.

10 Claims, 7 Drawing Figures

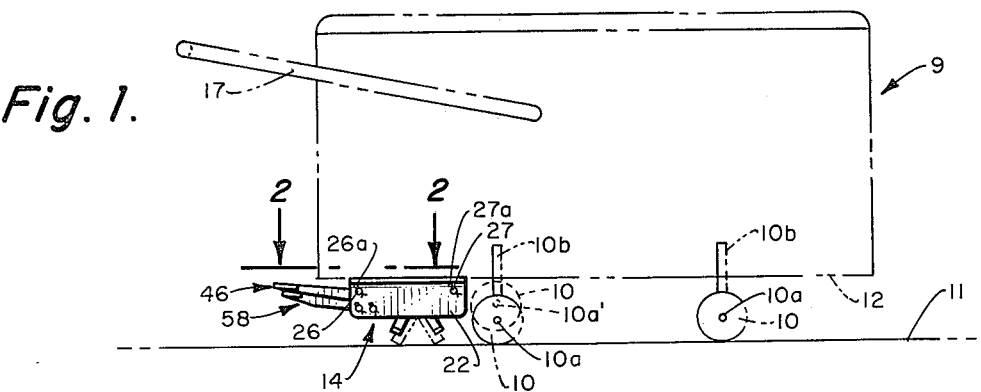
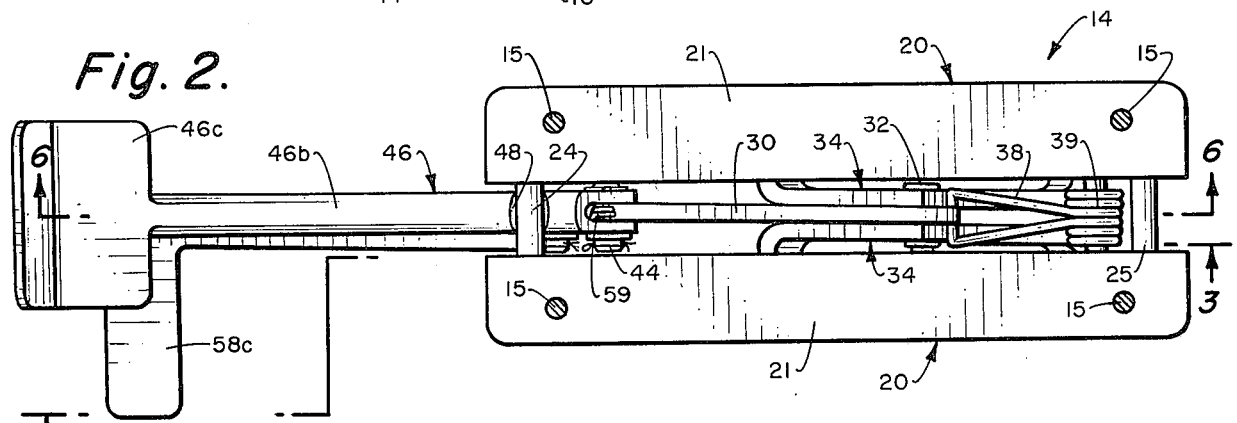
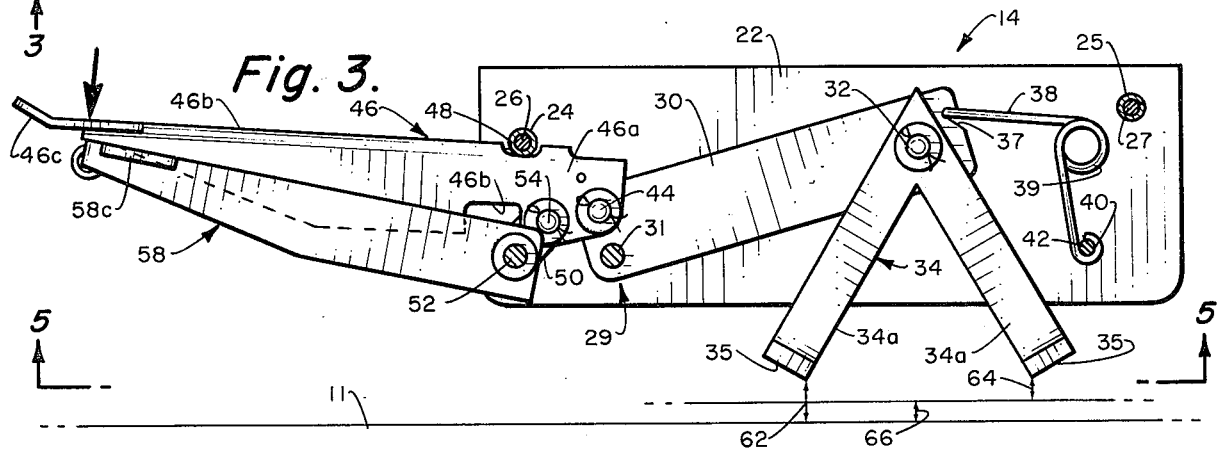
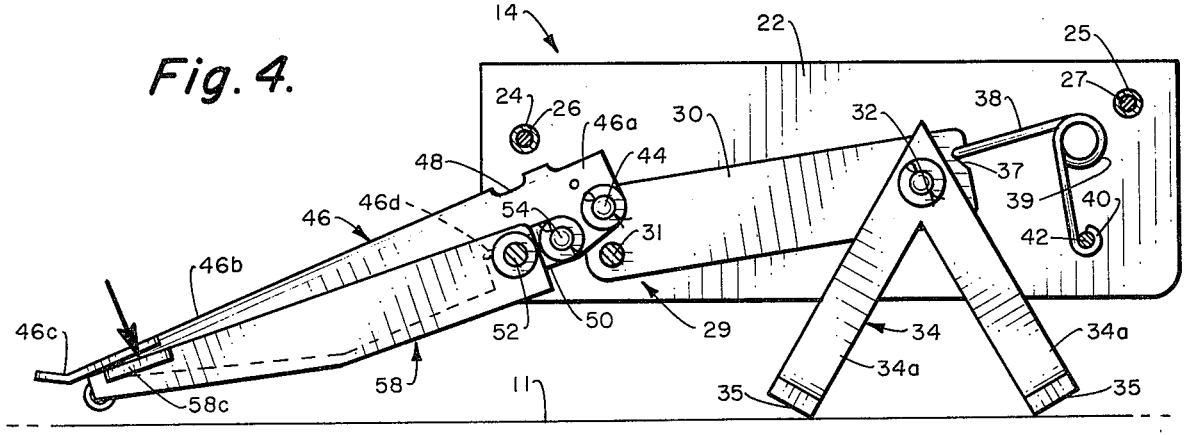

TROLLEY CART BRAKING SYSTEM

BACKGROUND OF THE INVENTION

Trolley carts are moved along in the aisle of an aircraft in order to provide food and drink for the passengers. It is often necessary that the cart be moved to one side of the aisle in order to permit passengers to pass and therefore, at least two wheels of the cart have been swiveled to permit the cart to be moved sideways in the aisle. When rough weather is encountered, it is necessary that at least some wheels of the cart be braked in order to prevent the cart from rolling away from the attendant. When four swiveled wheels are utilized on the cart, it is necessary to brake at least two of the wheels to secure the cart. Generally, a separate brake is provided on each wheel that is to be locked and the brake consists of a pivoted lever which is rotated downward by the attendant's foot to cause a brake to engage the tire of the wheel. In order to release the brake, it is necessary for the attendant's toe to be placed underneath the lever so that the lever can be rotated in the opposite direction in order to unlock the brake. Since the braking element acts against the wheel tire, the brake will become loose and ineffective as the tire wears. Also, it is often difficult for the stewardess to locate and move the pivoted foot lever on a swiveled wheel since the wheel can assume a position underneath the cart. Another type of individual wheel brake consists of a lever type which binds the outer bearing race of the wheel. This type also requires that it be operated by the foot of the attendant to set and release the brake. With prior types of brakes associated with individual wheels, it is often necessary to purchase the entire brake system with the wheel as a unit when it is necessary to replace a faulty braking wheel.

SUMMARY OF THE INVENTION

The braking system of the present invention utilizes a braking device which is separate from the individual wheels of the cart, whether or not they are fixed or swiveled. The invention is operative for carts which have four swivel wheels or two swivel wheels and two fixed wheels. The braking device is operated by downward depression of a foot pedal which takes the weight of the loaded trolley cart off the wheels and transfers it to feet which are forced into contact with the floor by a linkage mechanism. The feet are spread apart in engagement with the floor to provide for stability of the cart in the braked condition and the wheels of the cart remain close to the floor after braking to further prevent excessive tipping of the cart. In order to release the weight of the cart back onto the wheels, a second foot pedal located alongside the first foot pedal is also operated by downward movement. The brake device is located on the bottom of the cart at the rear of the cart center line and the pedals protrude from the rear end of the trolley cart a sufficient distance, such as two inches, to be easily accessible for the attendant's foot. When depressed, the two pedals slightly clear the rug or floor. No adjustment to the brake device is necessary after installation on the cart and there are no parts which will wear during the lifetime of the cart. Thus, maintenance costs are reduced to an absolute minimum.

The 4 feet of the brake are located at the end of two pivotally mounted legs which are moved upwardly and downwardly by the linkage mechanism, which is an over center type operated and released by the two foot pedals. The braking device includes a spring which holds the four feet off the floor when the linkage mechanism is moved through the over center position downwardly.

BRIEF DESCRIPTION OF THE DRAWINGS

FIG. 1 is a side elevational view showing the brake device mounted underneath the floor of the trolley cart with the operating foot levers extending rearwardly of the cart;

FIG. 2 is a top plan view of the brake device showing the two brake levers in the unlocked position;

FIG. 3 is a vertical section along line 3—3 of FIG. 2 showing the brake feet above the floor in non-braking position;

FIG. 4 is a vertical section similar to FIG. 3 showing the brake feet engaging the floor in braking position;

DESCRIPTION OF THE PREFERRED EMBODIMENT

Figure 5:
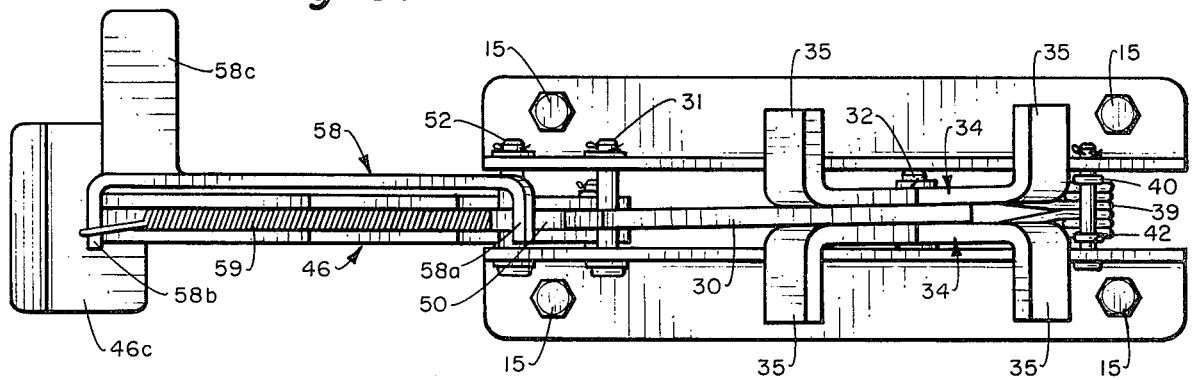
FIG. 5 is a bottom plan view along line 5—5 of FIG. 3.

Referring to FIG. 1, there is shown a trolley cart 9 of the type usually used for service of passengers of aircraft while in flight, the body of the cart being shown in phantom lines. The cart has two front and two rear swiveled wheels 10 which roll on floor 11 about an axis 10a, it being understood that one pair of wheels could be fixed. The pivot mounting shaft 10b for each wheel is received in a socket (not shown) in the lower surface 12 of the cart in the usual manner. Braking device 14 is attached to the bottom surface 12 of the trolley cart 9 by means of a plurality of bolts 15. The brake is located along the center line of the cart and slightly rearwardly of the two rear wheels 10. The use of four swivel wheels gives the cart the required maneuverability so that the cart can go sideways in the aisle as well as forward and backward. However, any number and type of wheels can be utilized on the cart since two or more can be fixed to rotate in only the one plane. A handle 17 is located at the rear end of the cart for convenient movement of the cart by the attendant.

The brake mechanism 14 consists of two side members 20, each of which has a top horizontal flange 21 on a vertical side 22. The sides 22 are held in fixed, spaced apart position by spacing sleeves 24 and 25 which surround bolts 26 and 27, respectively which extends through the sides. Sides 22 are held tightly against the ends of the sleeves to space the sides apart a fixed distance and cotter pins 26a and 27a secured to ends of bolts 26 and 27, respectively (see FIG. 1).

A lever mechanism 29 is supported by side plates 22 and comprises a lever arm 30 located centrally between the sides 22. The arm 30 is pivoted at one end by a fixed pin 31 which extends through openings in the sides 22. A pin 32 passes through the other end of lever arm 30 and pivotally mounts a pair of braking members 34, on each side of the lever 30. Each braking member consists of two legs 34a and pin 32 passes through the apex of the angle formed between the two legs. The lower end of each leg 34a terminates in a foot 35 which is normally located slightly above the floor surface 11 (see FIG. 3) in non-braking position. Braking members 34 can assume any angle required to place the feet 35 upon the contour of the floor surface upon actuation of the brake device 14.

The end of lever arm 30 adjacent pin 32 contains a notch 37 which receives the end of intermediate portion 38 of a coil spring 39. The two ends 40 of the coil spring are wrapped around a pin 42 which is secured in openings in side plates 22. Spring portion 38 continually produces an upward force on the end of lever 30 in a direction to rotate it about fixed pin 31. The end of lever arm 30 directly above fixed pivot 31 is connected by pivot pin 44 to opposite sides 46a of a channel shaped foot pedal 46. Upper surface 46b of foot pedal 46 contains a cutout 48 which is biased against sleeve 24 by spring 39 when the linkage mechanism 29 is in its normal, non-braking position and sleeve 24 prevents further upward movement of the pedal 46.

Figure 7:
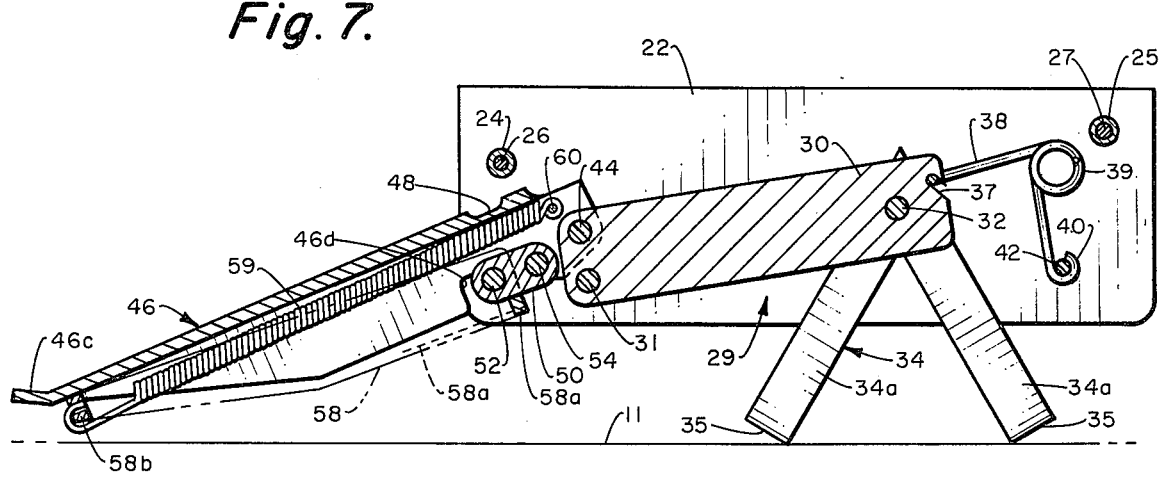
FIG. 7 is a vertical section similar to FIG. 6 showing the linkage mechanism in the braking position.

When it is desired to brake the trolley cart, the attendant's foot is applied to the foot portion 46c of the foot lever 46 and the attendant pushes downwardly on the lever until it assumes the position shown in FIG. 4. This downward movement of the foot lever 46 causes feet 35 to move downwardly and engage the floor 11, and the amount of downward movement is sufficient to raise the rear wheels 10 of the cart slightly above the floor surface so that the cart is thereafter braked. Link 50 of linkage mechanism 29 is pivotally connected at one end to pin 52 fixed to sides 22 and the other end of link 50 is connected by a pin 54 to sides 46a of the channel shaped foot lever 46. Downward foot pressure on the portion 46c causes the lever 46 to rotate about the pin 44 where it is pivoted to the lever 30. At the same time, pin 54 moves downwardly because it is connected by link 50 to fixed pivot 52. Downward clockwise rotation of link 50 is stopped in the over center position of FIG. 4 when the cutout 46d in the sides 46a of lever 46 engage fixed pin 52. In the over center position of the linkage mechanism in FIG. 4, the upward force of spring 39 holds the lever 46 in the same position against the pin 52 since the pin 54 is below the line between pins 44 and 52. Spring 39 therefore holds the feet 35 in the floor engaging position to continually brake the cart after the lever 46 has been pushed into its downward position (FIGS. 4 and 7). The distance of movement of the feet 35 in the vertical direction between the braking and non-braking positions is fixed by the location of pins 26 and 52 relative to one another and this vertical throw is set to an amount sufficient for the feet 35 to engage the floor and lift the rear wheels slightly from the floor in order to place at least a part of the weight of the cart on the feet 35.

Figure 6:
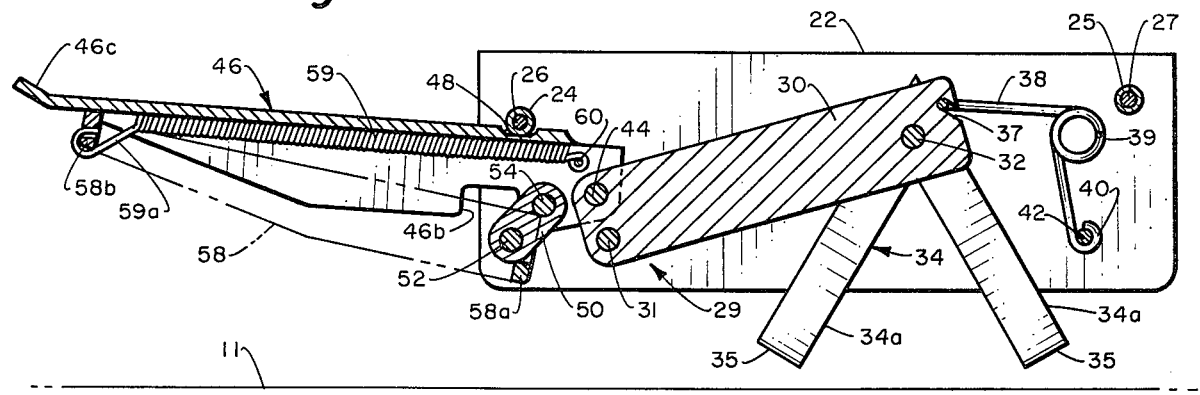
FIG. 6 is a vertical section along line 6—6 of FIG. 2 showing linkage mechanism in non-braking position.

A second foot lever 58 is rotatably mounted at one end on fixed pin 52 and the lever has a projection 58a which is located opposite link 50 (FIG. 6). Lever 58 has a projecting lug 58b on the outer end which is connected by spring 59 to a pin 60 on the foot lever 46. Spring 59 normally holds lever 58 in the upward position underneath and aginst the lever 46 as illustrated in FIGS. 3 and 4. When it is desired to release the cart 9, lever 58 is rotated downwardly about pin 52 relative to lever 46 by foot pressure on lever portion 58c and this movement causes counterclockwise rotation of link 50 about pin 52 until pin 54 passes through the dead center position and above the line between pins 44 and 52. Thereafter, the spring 39 will snap the cutout 48 of lever 46 against sleeve 24 and hold the linkage mechanism in the non-braking position with feet 35 lifted above the floor. The small amount of movement of the lever end 58a to release the over center braking condition of the linkage mechanism is illustrated by the dotted line position of projection 58a in FIG. 7.

Thus, the linkage mechanism 29 and feet 35 assume either the non-braking, normal position of FIGS. 3 and 6 or the braking position of FIGS. 4 and 7. Only a slight pressure is required to move the link 50 counterclockwise and trigger the brake unlocking action. The action of brake feet 35 on floor 11 is illustrated in FIG. 3 wherein the downward movement of the feet 35 from the non-braking to the braking position is illustrated by the length of the arrow line 62. This distance is equal to the difference in position of pin 32 in FIGS. 3 and 4. An acceptable amount of total throw (length of line 62) would be approximately one half inch or so. In the up position, the feet 35 are normally located approximately one quarter inch to three eighths inch off the floor 11 as indicated by the length of the arrow 64 in FIG. 3. Arrow 66 represents the amount by which the cart is moved upwardly off the floor after the feet engage the floor. For instance, if the total throw (arrow 62) is one half inch and the feet 35 are normally one quarter inch off the floor in the non-braking position, the cart would be lifted one quarter inch off the floor so that the rear wheels no longer touched the floor. The rear of the cart would then be supported by feet 35 and it would not be possible for the cart to move either rearwardly, forwardly or sideways. In FIG. 1, the axis 10a of the rear wheels 10 would move to position 10a' and the rear wheels 10 would move to the dotted line position 10 which is slightly above the floor 11 while the front wheels 10 remain in engagement with the floor 11. When carts are utilized on floors of linoleum or fiberglass, the feet 35 will be rubberized to grip the floor surface. Also, when the floor is carpeted, feet 35 will ride on the fabric surface when in the up condition and can move through the fabric into the rigid engagement with carpet backing in order to lift the cart.

Since feet 35 on opposite members 34 extend in opposite directions and since the legs of each braking member 34 are spaced apart longitudinally, considerable stability is obtained from feet 35 against tipping of the cart when the cart is braked. Also, since the rear wheels remain very close to the floor when the cart is braked, only slight tipping can result before the wheels will be engaged with the floor. As previously mentioned, an angle of the floor relative to the bottom of the cart is compensated for by permitting the legs to pivot so that the feet can engage any surface contour at two spaced points. It will be apparent from the above description that both the braking action and the brake releasing action require only a downward push by the foot of the attendant and it is unnecessary for the feet of the attendant to maneuver underneath the cart to reach below a swiveled wheel in order to obtain a releasing action. Since the foot pedal portions 46c and 58c are levers continually located approximately two inches rearwardly of the cart, they are always convenient to the attendant. In the event that the cart wheels are replaced with wheels of different diameter, it is only necessary to change the length of the braking members 34 since the linkage throw (arrow 62) will remain the same. Since the brake device 14 is separate from the wheels, it is only necessary to replace the wheel and not the brake. Since the locking and unlocking movements are of a push-down nature, the attendant can wear soft comfortable shoes and still easily operate the brake mechanism. Since there are no parts in the brake device which would be likely to wear during the life time of the cart, the maintenance costs will be reduced to an absolute minimum.

What is claimed is:

1. A braking device for a trolley cart which is normally rolled over a floor on wheels attached to the bottom of the cart comprising;

braking member attached to the bottom of said cart and extending downwardly towards the floor;

the ends of said member comprising feet for engaging the floor;

an over center linkage mechanism for moving said member between a non-braking position with said feet above the floor and a braking position with said feet engaging said floor; said being located in said non-braking position at a distance above the floor less than the total movement of said braking member produced by said linkage mechanism so that upon engagement of said feet with said floor during movement to said braking position, said cart is moved upwardly by an amount sufficient for at least two of said wheels to clear the floor, said feet thereafter resisting movement of the cart;

said linkage mechanism comprising a first foot lever movable downwardly to move said feet from said non-braking to said braking position and a second foot lever movable relatively to said first lever downwardly to return said feet to the non-braking position, and a lever arm pivotally mounted at one end on a pivot fixed with respect to said cart, spring means for biasing the other end of said lever arm in an upward direction, said braking member being pivoted on said lever arm at said other end for bodily movement with said lever arm about said fixed pivot, said lever arm being pivotally connected at said one end to said first foot lever, and a link pivotally connected at one end to a second fixed pivot and at the other end to a pivot on said first foot lever at a location spaced from the pivot connection between said foot lever and said lever arm.

2. The braking mechanism as defined in claim 1 wherein said link is moved by said first foot lever during braking in a clockwise direction to cause the pivot connection of said link with said first foot lever to move below a line through said second fixed pivot and the pivot connection between said lever arm and said first foot lever.

3. A braking mechanism as defined in claim 2 wherein said second foot lever is pivotally connected to said second fixed pivot and moves said link in a counterclockwise direction to cause said pivot connection of said link with said first foot lever to move above said line.

4. The braking mechanism as defined in claim 3 having second spring means for normally holding said second foot lever adjacent said first foot lever during brake applying action and permitting rotation of said second lever relative to said first lever to rotate said link counterclockwise and return said linkage mechanism to said non-braking position.

5. The braking mechanism as defined in claim 4 wherein said second lever has a protruding end adjacent said second fixed pivot, said protruding end engaging said link and moving said link independently of said first foot lever.

6. A braking device for a trolley cart which is normally rolled over a floor on wheels attached to the bottom of the cart comprising:

braking member attached to the bottom of said cart and extending downwardly towards the floor;

the end of said member comprising support means for engaging the floor; and an over center linkage mechanism for moving said member between a non-braking position with said support means above the floor and a braking position with said support means engaging said floor; said support means being located in said non-braking position at a distance above the floor less than the total movement of said braking member produced by said linkage mechanism so that said cart is moved upwardly upon engagement of said support means with said floor during movement to said braking position, said support means thereafter resisting movement of the cart;

said braking member comprises a pair of angularly positioned legs connected together at their apex and pivotally mounted at their apex to said linkage mechanism by a pivot pin for rotation of said legs about said pivot pin, said support means comprising the opposite ends of said legs from said apex.

7. A braking device as defined in claim 6:

said opposite ends of said legs comprising feet extending laterally from said legs to provide support against tipping of said cart.

8. A braking device as defined in claim 7:

a second pair of angularly positioned legs connected together at their apex and pivotally mounted at their apex to said linkage mechanism by said pivot pin, said second pair of legs having feet at the opposite ends from said apex extending laterally in a direction opposite to said feet on said first mentioned pair of legs.

9. A braking device for a trolley cart which is normally rolled over a floor on wheels attached to the bottom of the cart comprising;

braking member attached to the bottom of said cart and extending downwardly towards the floor;

the end of said member comprising support means for engaging the floor;

an over center linkage mechanism for moving said member between a non-braking position with said support means above the floor and a braking position with said support means engaging said floor; said support means being located in said non-braking position at a distance above the floor less than the total movement of said braking member produced by said linkage mechanism so that upon engagement of said support means with said floor during movement to said braking position, said cart is moved upwardly by an amount for sufficient number of said wheels to clear the floor so that said support means thereafter resists movement of the cart;

said linkage mechanism comprise a lever arm pivoted adjacent one end to said cart; said braking means being pivotally mounted on said lever arm adjacent the other end of said lever arm; and spring means directly engaging said other end of said lever arm for biasing said brake means to either the non-braking or braking position.

10. A braking device as defined in claim 9; p1 said braking member comprising a pair of angularly positioned legs connected together at their apex and pivotally mounted at their apex to said lever arm by a pivot pin, said support means comprising feet at the opposite ends of said legs from said apex, said feet extending laterally from said legs to provide support against tipping of said cart.

* * * * *